(12) United States Patent
Morio et al.

(10) Patent No.: US 9,746,042 B2
(45) Date of Patent: Aug. 29, 2017

(54) OPPOSED-PISTON DISC BRAKE CALIPER

(71) Applicant: AKEBONO BRAKE INDUSTRY CO., LTD, Tokyo (JP)

(72) Inventors: Takefumi Morio, Tokyo (JP); Tetsuya Noguchi, Tokyo (JP); Tsuyoshi Suzuki, Tokyo (JP); Yoshio Totsuka, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/996,305

(22) Filed: Jan. 15, 2016

(65) Prior Publication Data

US 2016/0208872 A1    Jul. 21, 2016

(30) Foreign Application Priority Data

Jan. 19, 2015    (JP) ................. 2015-007599

(51) Int. Cl.
| | |
|---|---|
| *F16D 65/18* | (2006.01) |
| *F16D 55/228* | (2006.01) |
| *F16D 55/00* | (2006.01) |
| *F16D 125/04* | (2012.01) |

(52) U.S. Cl.
CPC ........... *F16D 65/18* (2013.01); *F16D 55/228* (2013.01); *F16D 2055/0016* (2013.01); *F16D 2125/04* (2013.01)

(58) Field of Classification Search
CPC .. F16D 65/00668; F16D 65/18; F16D 55/228; F16D 2055/0016; F16D 2125/04; F16D 65/0068
See application file for complete search history.

(56) References Cited

U.S. PATENT DOCUMENTS

| | | | |
|---|---|---|---|
| 6,173,819 B1 * | 1/2001 | Meiss | F16D 55/224 188/370 |
| D555,555 S * | 11/2007 | Ikuzawa | D12/180 |
| 2007/0170020 A1 | 7/2007 | Halasy-Wimmer et al. | |

(Continued)

FOREIGN PATENT DOCUMENTS

| | | |
|---|---|---|
| EP | 1911989 A1 | 4/2008 |
| EP | 2022999 A1 | 2/2009 |

(Continued)

OTHER PUBLICATIONS

Extended European Search Report issued on Jun. 14, 2016 in corresponding European patent application 116151631.5 (8 pages).

*Primary Examiner* — Bradley King
(74) *Attorney, Agent, or Firm* — Drinker Biddle & Reath LLP

(57) ABSTRACT

In an opposed-piston disc brake caliper, a pair of reinforcement bridge portions, which are inclined relative to an axial direction, are provided on outside of a rotor in a radial direction of the rotor so as to define corner opening portions in an opening portion which is defined by an inner body portion, an outer body portion, and an entry-side connection portion and an exit-side connection portion connecting the inner body portion and the outer body portion. A torque receiving portion of one of the entry-side torque receiving portion and the exit-side torque receiving portion is exposed toward an outside in the radial direction via the corner opening portions.

8 Claims, 17 Drawing Sheets

(56) References Cited

U.S. PATENT DOCUMENTS

| | | | | |
|---|---|---|---|---|
| 2007/0278049 A1* | 12/2007 | Kobayashi | ............ | F16D 55/228 188/73.39 |
| 2008/0185243 A1* | 8/2008 | Previtali | ................ | F16D 55/22 188/250 B |
| 2009/0071767 A1* | 3/2009 | Bass | .................... | F16D 55/228 188/72.5 |
| 2010/0170755 A1* | 7/2010 | Biggs | .................... | F16D 55/224 188/72.4 |
| 2012/0145492 A1* | 6/2012 | Gherardi | .............. | F16D 55/224 188/73.31 |
| 2013/0020155 A1* | 1/2013 | Crippa | ................. | F16D 55/228 188/73.31 |
| 2013/0092481 A1* | 4/2013 | Crippa | ................. | F16D 55/228 188/73.31 |
| 2013/0277158 A1* | 10/2013 | Previtali | .............. | F16D 55/228 188/73.47 |
| 2014/0158483 A1* | 6/2014 | Miyahara | ............. | F16D 55/228 188/73.47 |

FOREIGN PATENT DOCUMENTS

| | | |
|---|---|---|
| EP | 2553289 A1 | 2/2013 |
| JP | 2010-078055 A | 4/2010 |

\* cited by examiner

OPPOSED-PISTON DISC BRAKE CALIPER

BACKGROUND

The present invention relates to an improvement in a caliper of an opposed-piston disc brake that is used to brake a vehicle (for example, an automobile).

A disc brake is widely used to brake an automobile. When the disc brake is applied, a pair of pads, each of which is disposed on each of both axial sides of a rotor rotating along with a wheel, is pressed against both side surfaces of the rotor by pistons. In the related art, various structures of the disc brakes are disclosed, and in recent years, an opposed-piston disc brake, in which the pistons are provided on both sides of the rotor to face each other, has increasingly been used.

FIGS. 15 to 17 illustrate an example of the structure of the opposed-piston disc brake caliper in the related art disclosed in Patent Document 1. A caliper 1 is an integral cast component made of a light alloy such as an aluminum alloy or an iron alloy. The caliper 1 includes an inner body portion 2; an outer body portion 3; an entry-side connection portion 4; and an exit-side connection portion 5.

The inner body portion 2 among these portions is provided to face an inner-side surface (a side surface that faces the center of a center body in a lateral direction of the vehicle body when the disc brake is assembled in a vehicle) of a rotor 6 rotating along with a wheel. In contrast, the outer body portion 3 is provided to face an outer-side surface (a side surface that faces the outside in the lateral direction of the vehicle body when the disc brake is assembled in the vehicle) of the rotor 6. The entry-side connection portion 4 and the exit-side connection portion 5 are provided on the outside of an outer circumferential edge of the rotor 6 in a radial direction. The entry-side connection portion 4 between these portions connects an entry-side end portion of the inner body portion 2 to an entry-side end portion of the outer body portion 3. The exit-side connection portion 5 connects an exit-side end portion of the inner body portion 2 to an exit-side end portion of the outer body portion 3. An opening portion 7 is provided to radially pass through a region, the circumference of which is surrounded by both the inner body portion 2 and the outer body portion 3 and both the entry-side connection portion 4 and the exit-side connection portion 5. A circumferential intermediate portion of the inner body portion 2 is connected to a circumferential intermediate portion of the outer body portion 3 via a central bridge portion 8 that is provided on the outside of the outer circumferential edge of the rotor 6 in the radial direction while being disposed in a circumferential central portion of the opening portion 7. The central bridge portion 8 divides the opening portion 7 into two sections in the circumferential direction.

In the specification and the claims, unless specified, an axial direction, a circumferential direction, and a radial direction refer to the axial direction, the circumferential direction, and the radial direction of the rotor, respectively. Unless specified, an entry side refers to a region between both the inner body portion and the outer body portion which the rotor rotating along with the wheel during straight ahead traveling enters. An exit side refers to a region between both the inner body portion and the outer body portion from which the rotor moves away.

Inner cylinders 9, 9 and outer cylinders are respectively provided in surfaces of both the inner body portion 2 and the outer body portion 3 with the surfaces facing each other. FIG. 15 illustrates only the inner cylinders 9, 9. The outer cylinders having the same shape as that of the inner cylinders 9, 9 are also provided in the outer body portion 3 while the outer cylinders and the inner cylinders 9, 9 are disposed symmetrical to the rotor 6. In an assembled state of a disc brake apparatus, the inner cylinders 9, 9 open toward the inner-side surface of the rotor 6, and the outer cylinders open toward the outer-side surface of the rotor 6.

On the inside of the caliper 1, an inner pad 10 and an outer pad are supported in such a way as to be capable of being displaced in the axial direction while in use. For this reason, as illustrated in FIG. 17, a pair of projecting wall portions 11, 11 projecting in the axial direction are respectively provided in both circumferential end portions of each of side surfaces (an outer-side surface of the inner body portion 2 and an inner-side surface of the outer body portion 3) of the inner body portion 2 and the outer body portion 3 with the side surfaces facing each other. Metal support fittings 12, 12 are respectively fixed to radial inner surfaces of the projecting wall portions 11, 11 using bolts 13, 13. Both circumferential end portions of each of the inner pad 10 and the outer pad are engaged with engagement protruding parts 14, 14 of the metal support fittings 12, 12 in such a way that the inner pad 10 and the outer pad can be displaced in the axial direction, with the engagement protruding parts 14, 14 protruding from the radial inner surfaces of the projecting wall portions 11, 11 in the circumferential direction.

When the brake is applied, inner pistons press the inner pad 10, which is supported by the inner body portion 2, against the inner-side surface of the rotor 6, with the inner pistons being respectively fitted into the inner cylinders 9, 9 in an oil tight manner. Similarly, outer pistons press the outer pad, which is supported by the outer body portion 3, against the outer-side surface of the rotor 6, with the outer pistons being respectively fitted into the outer cylinders in an oil tight manner. Accordingly, the rotor 6 is durably interposed between the inner pad 10 and the outer pad on both sides in the axial direction. As a result, braking is performed due to friction between the inner pad 10 and the outer pad and both the axial side surfaces of the rotor 6. When the brake is applied, torque applied to each of both the inner pad 10 and the outer pad is borne by an entry-side torque receiving portion 15 and an exit-side torque receiving portion 16 which are respectively provided on an inner side and an outer side with the rotor 6 interposed therebetween. In the illustrated structure, the entry-side torque receiving portion 15 and the exit-side torque receiving portion 16 are respectively formed of the projecting wall portions 11, 11 and the metal support fittings 12, 12.

The opposed-piston disc brake caliper requires performances illustrated in (1) and (2).

(1) Improvement in Cooling Capacity (Heat Dissipation Capacity)

When the brake is applied, heat is produced due to friction between the side surfaces of the rotor and linings of both the inner pad and the outer pad, and the insufficient cooling of the rotor and both the inner pad and the outer pad may reduce a frictional coefficient, and decrease braking force. Heat is transmitted from the inner pad and the outer pad to the caliper via the torque receiving portions, and a high temperature of the caliper may increase the temperature of a brake fluid present inside of the caliper, and decrease braking force as well.

(2) Ensuring Rigidity

When the brake is applied, as a reaction to the event in which both the inner pad and the outer pad are pressed against both the side surfaces of the rotor by the inner pistons and the outer pistons, force is applied to both the inner body portion and the outer body portion in a direction in which the inner body portion and the outer body portion move away from each other. For this reason, when the rigidity of the caliper is not sufficient, both the inner body portion and the outer body portion may be elastically deformed in the direction in which the inner body portion and the outer body portion move away from each other, and a so-called braking force may not be obtainable. In a case where the rigidity is not sufficient, when the brake is applied, elastic deformation may occur such that the outer body portion is displaced relative to the inner body portion in a rotational direction of the rotor, and vibration or noise may occur.

The opposed-piston disc brake caliper requires the performances illustrated in (1) and (2); however, the obtaining of the performances illustrated in (1) and (2) is difficult.

For example, in the caliper 1 with the structure in the related art illustrated in FIGS. 15 to 17, inner end edges of the entry-side connection portion 4 and the exit-side connection portion 5 extend further inwards (to the center) than the entry-side torque receiving portion 15 and the exit-side torque receiving portion 16 in the circumferential direction, with circumferential end edges of the opening portion 7 being partitioned off by the inner end edges. For this reason, this is disadvantageous in that both the entry-side torque receiving portion 15 and the exit-side torque receiving portion 16 are not efficiently cooled. In order to improve cooling capacity, the area of the opening portion 7 is deemed to be increased by moving the positions of the inner end edges of the entry-side connection portion 4 and the exit-side connection portion 5 further outwards than the illustrated positions in the circumferential direction. When such a configuration is adopted, it is possible to improve the cooling capacity of the rotor 6 and both the inner pad 10 and the outer pad, and it is possible to easily cool both the entry-side torque receiving portion 15 and the exit-side torque receiving portion 16. However, when such a configuration is adopted, the circumferential width dimensions of both the entry-side connection portion 4 and the exit-side connection portion 5 are decreased, and thus, it is not easy to ensure the rigidity of the caliper 1. As such, it is not easy to improve the cooling capacity and to ensure the rigidity of the opposed-piston disc brake caliper.

[Patent Document 1] JP-A-2010-078055

SUMMARY

The present invention is made in light of these problems, and an object of the present invention is to realize the structure of an opposed-piston disc brake caliper which improves cooling capacity and ensures rigidity.

According to one advantageous aspect of the present invention, there is provided an opposed-piston disc brake caliper comprising:

an inner body portion, provided so as to face an inner-side surface of a rotor that rotates along with a wheel, and including an inner cylinder which opens toward the inner-side surface of the rotor;

an outer body portion, provided so as to face an outer-side surface of the rotor, and including an outer cylinder which opens toward the outer-side surface of the rotor;

an entry-side connection portion and an exit-side connection portion, provided on outside of the rotor in a radial direction of the rotor, and connecting both end portions of the inner body portion to both end portions of the outer body portion in a circumferential direction of the rotor;

an entry-side torque receiving portion and an exit-side torque receiving portion, configured to bear torque which is applied to a pair of pads when a brake is applied, while the pair of pads is supported so as to be displaced in an axial direction of the rotor with the rotor being interposed therebetween; and an opening portion, passing in the radial direction through a region surrounded by both the inner body portion and the outer body portion and both the entry-side connection portion and the exit-side connection portion, wherein a pair of reinforcement bridge portions, which are inclined relative to the axial direction, are provided on the outside of the rotor in the radial direction so as to define corner opening portions in the opening portion which are divided off from other portions of the opening portion, one of the reinforcement bridges bridges a gap from an axial intermediate portion of an inner end edge of at least one connection portion of the entry-side connection portion and the exit-side connection portion, the inner end edge being defining a circumferential end portion of the opening portion, to a portion on the one connection portion side of the inner body portion in the circumferential direction where the portion is positionally aligned with the inner cylinder, the other of the reinforcement bridges bridges a gap from the axial intermediate portion of the inner end edge of the one connection portion to a portion on the one connection portion side of the outer body portion in the circumferential direction where the portion is positionally aligned with the outer cylinder, and wherein a torque receiving portion of one of the entry-side torque receiving portion and the exit-side torque receiving portion is exposed toward the outside in the radial direction via the corner opening portions.

The reinforcement bridge portion may have a straight shape or a bent shape (for example, a circular arc shape). When one inner cylinder and one outer cylinder are provided, the one inner cylinder and the one outer cylinder are respectively equivalent to the inner cylinder and the outer cylinder which are present on the one connection portion disclosed in the claims.

A circumferential outer end portion of the reinforcement bridge portion may be connected to the axial intermediate portion of the inner end edge of the one connection portion via a joint portion extending in the circumferential direction.

The reinforcement bridge portions may be respectively provided in both the entry-side connection portion and the exit-side connection portion in a bridging manner.

A circumferential intermediate portion of the inner body portion may be connected to a circumferential intermediate portion of the outer body portion via a central bridge portion that is provided on the outside of the rotor in the radial direction.

An entry-side portion of the central bridge portion may be set to have a radial thickness dimension larger than that of an exit-side portion of the central bridge portion.

Both the entry-side torque receiving portion and the exit-side torque receiving portion may be integrally provided in each of the inner body portion and the outer body portion.

The corner opening portion may open both in the radial direction and in the axial direction.

The corner opening portion may open both in the radial direction and in the circumferential direction.

BRIEF DESCRIPTION OF DRAWINGS

FIG. 13A is a front view, FIG. 13B is a right side view, and FIG. 13C is a top view.

DETAILED DESCRIPTION OF EXEMPLIFIED EMBODIMENTS

Figure 1:
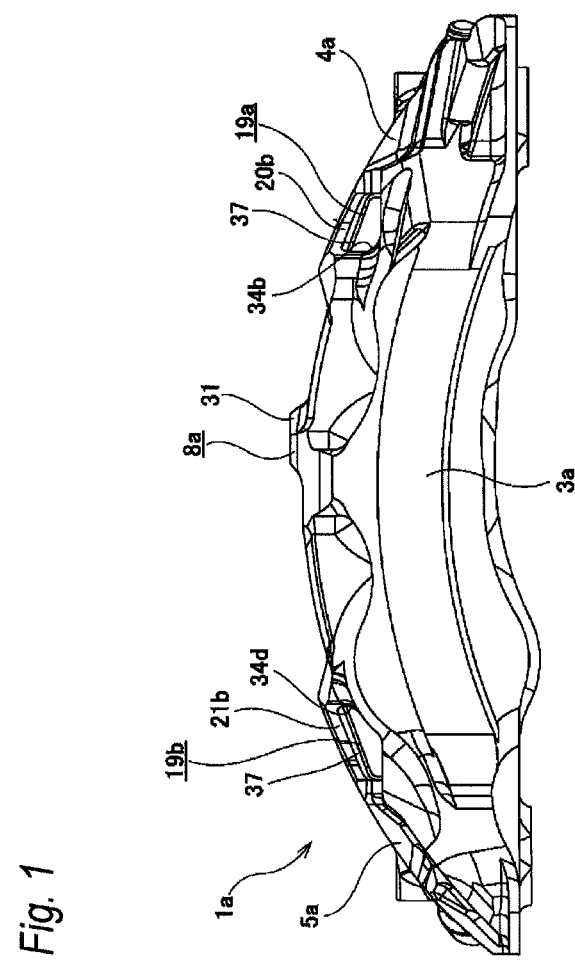
FIG. 1 is a front view of an opposed-piston disc brake illustrating an embodiment of the present invention.
Figure 2:
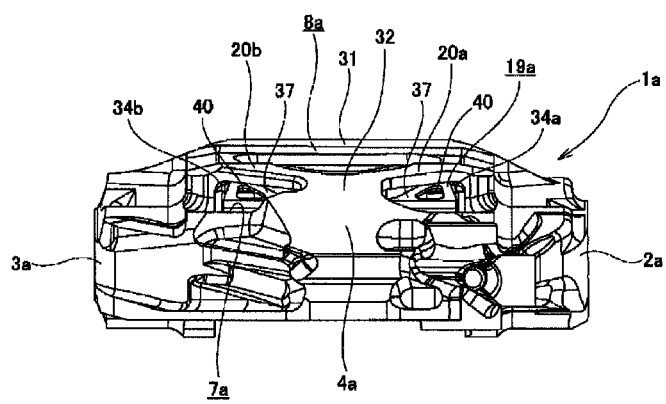
FIG. 2 is a right side view of the opposed-piston disc brake.
Figure 3:
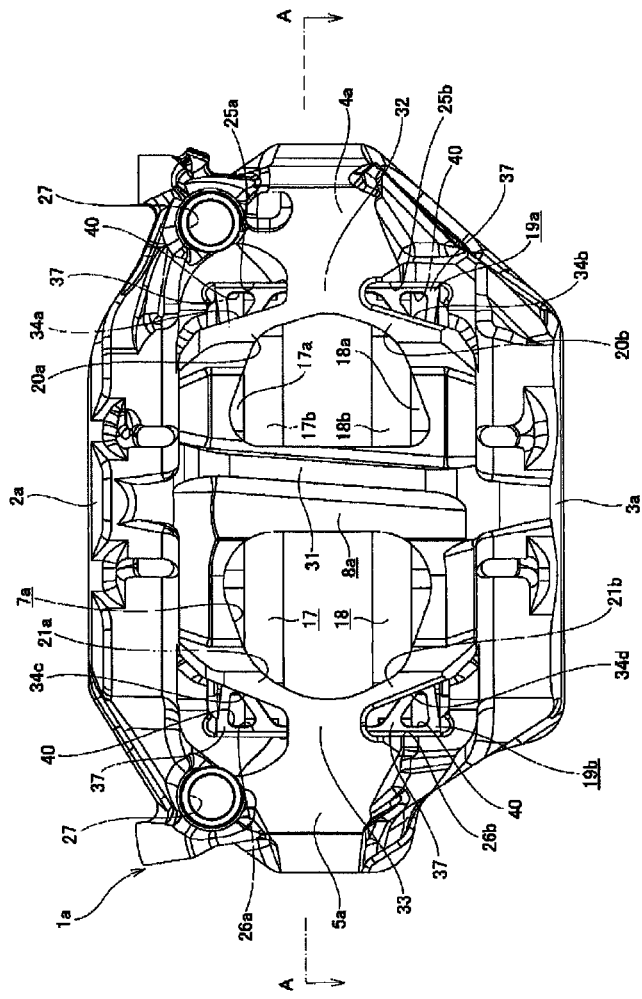
FIG. 3 is a top view of the opposed-piston disc brake.
Figure 4:
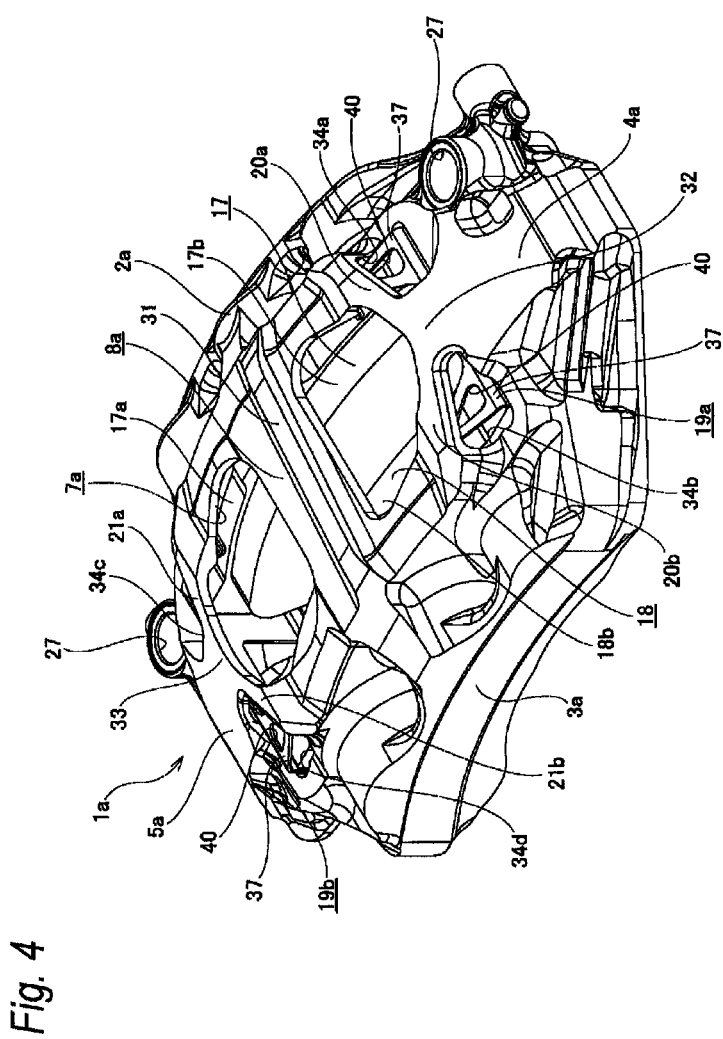
FIG. 4 is a perspective view when the opposed-piston disc brake is seen from the outside in a radial direction and an outer side of the opposed-piston disc brake.
Figure 5:
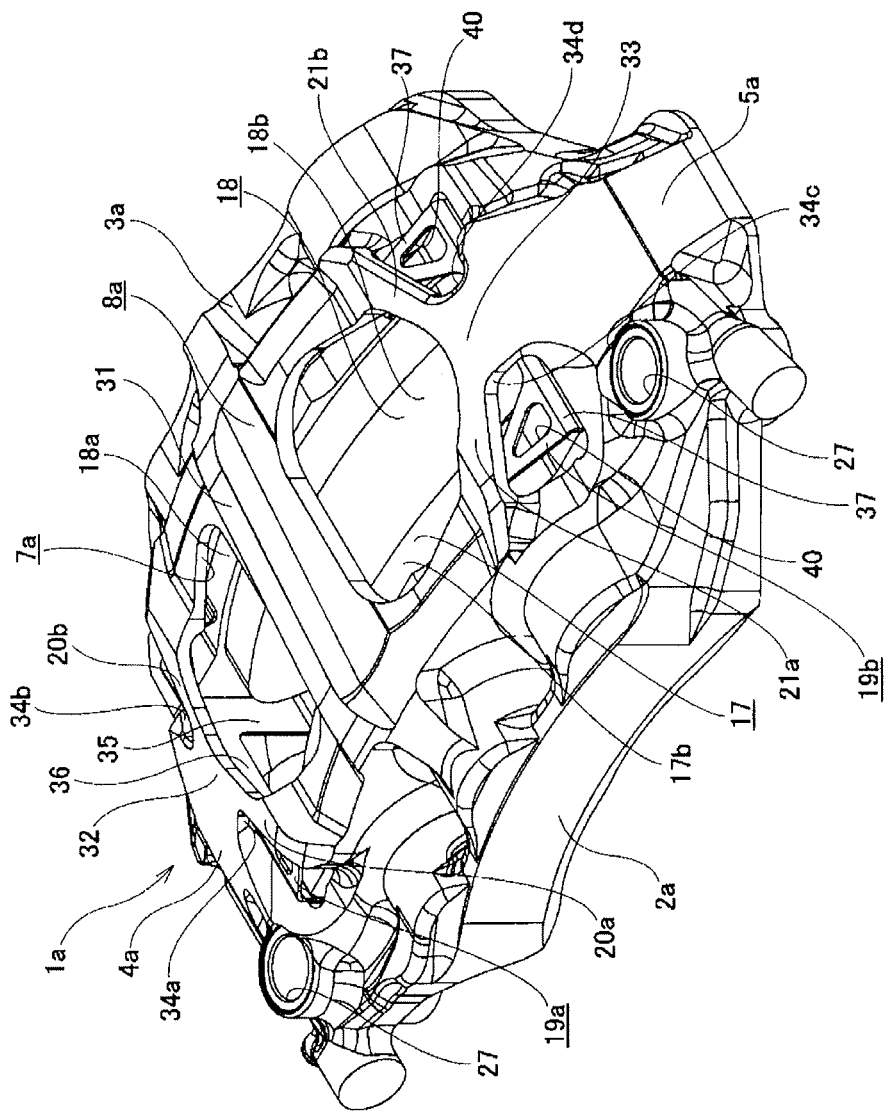
FIG. 5 is a perspective view when the opposed-piston disc brake is seen from the outside in the radial direction and an inner side thereof.
Figure 6:
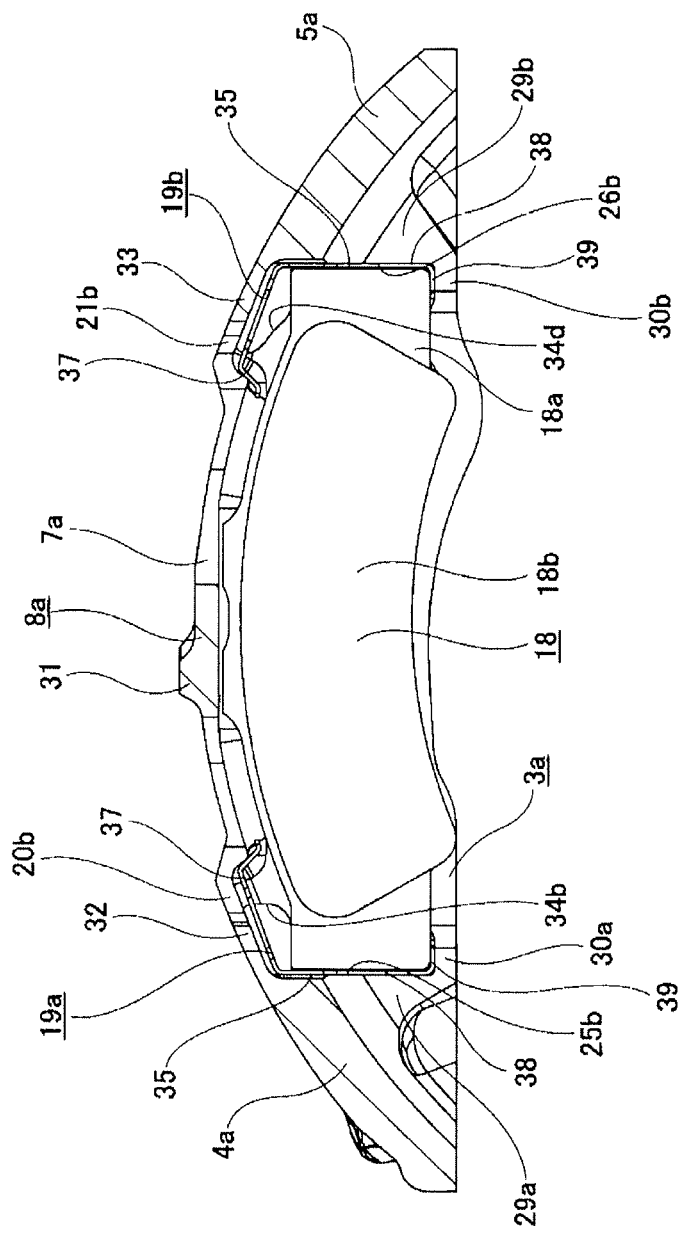
FIG. 6 is a sectional view of the opposed-piston disc brake taken along line A-A in FIG. 3.
Figure 7:
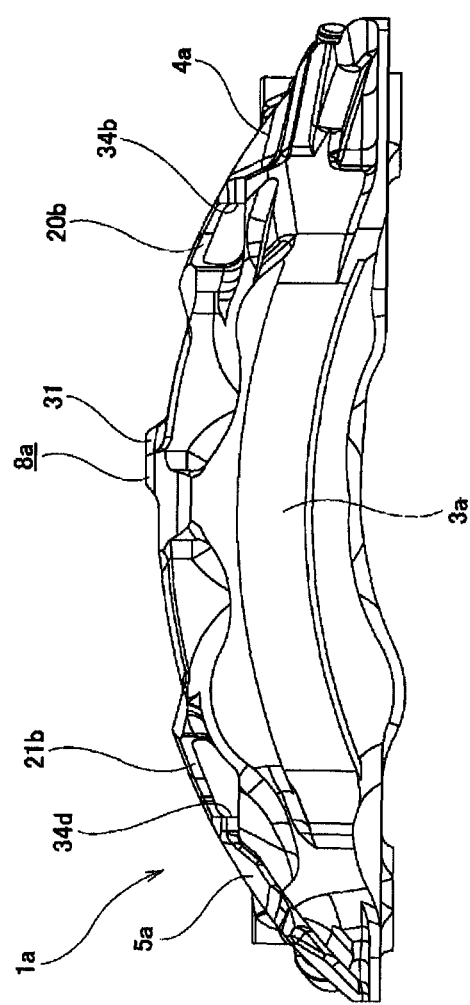
FIG. 7 is a view illustrating a caliper detached from the opposed-piston disc brake, which is equivalent to FIG. 1.
Figure 8:
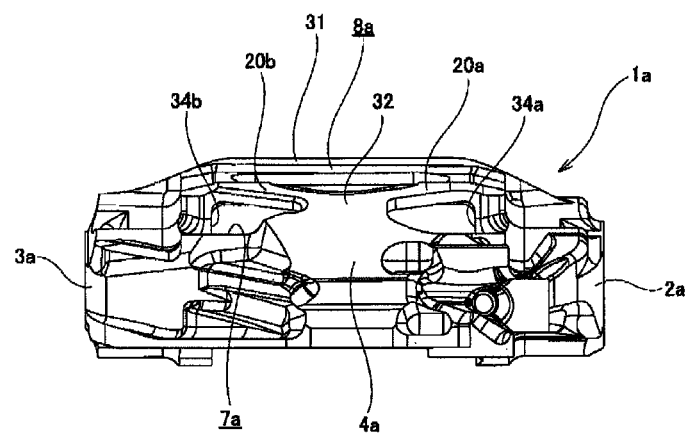
FIG. 8 is a view illustrating the caliper detached from the opposed-piston disc brake, which is equivalent to FIG. 2.
Figure 9:
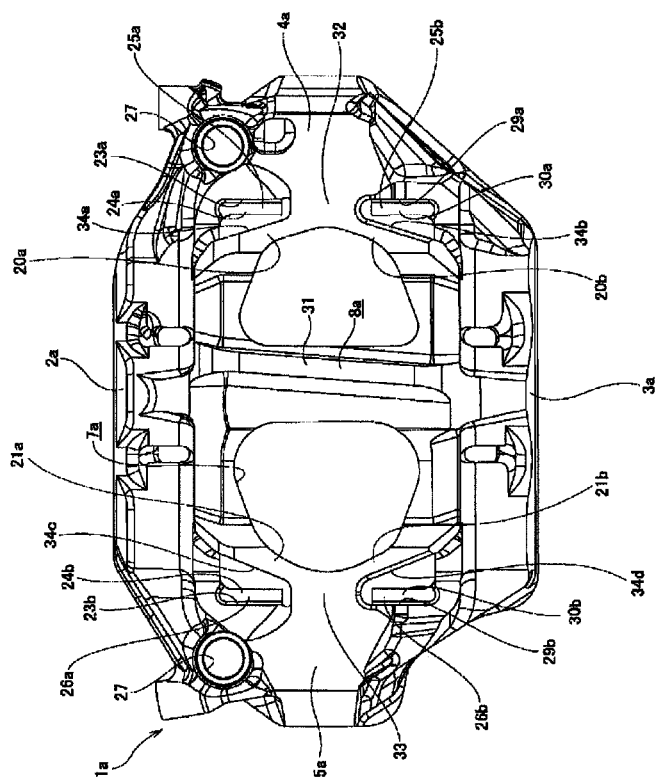
FIG. 9 is a view illustrating the caliper detached from the opposed-piston disc brake, which is equivalent to FIG. 3.
Figure 10:
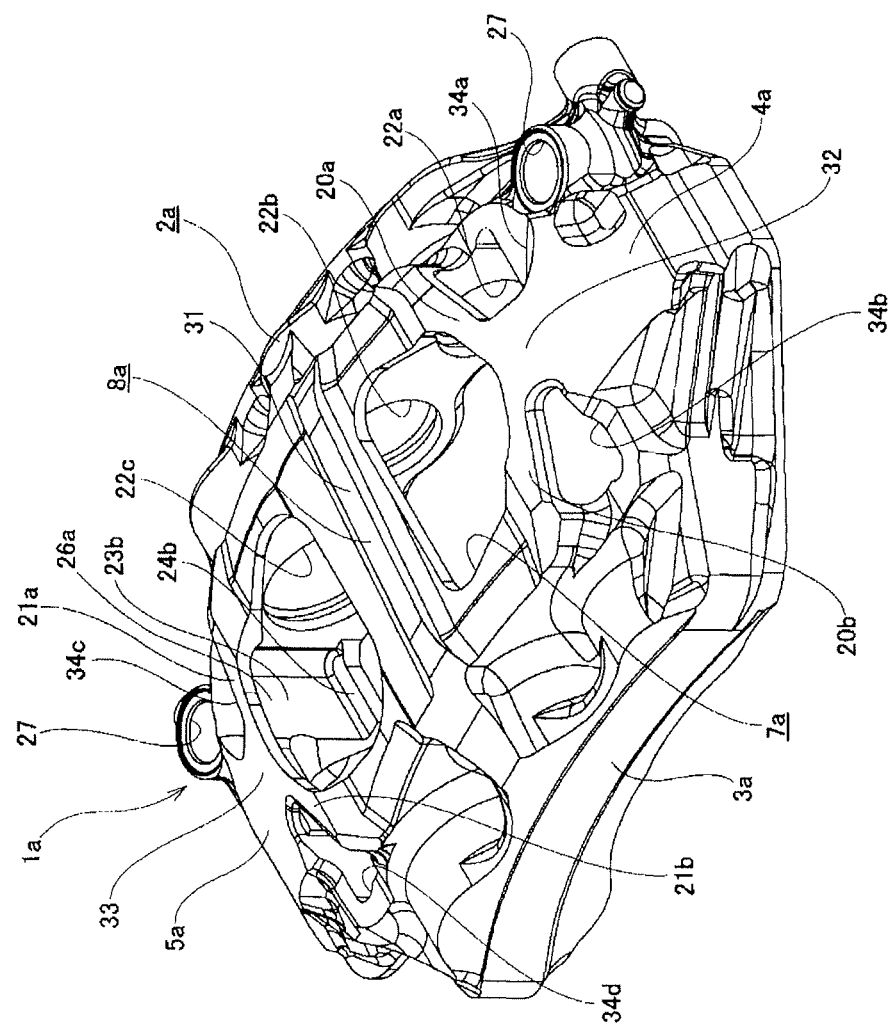
FIG. 10 is a view illustrating the caliper detached from the opposed-piston disc brake, which is equivalent to FIG. 4.
Figure 11:
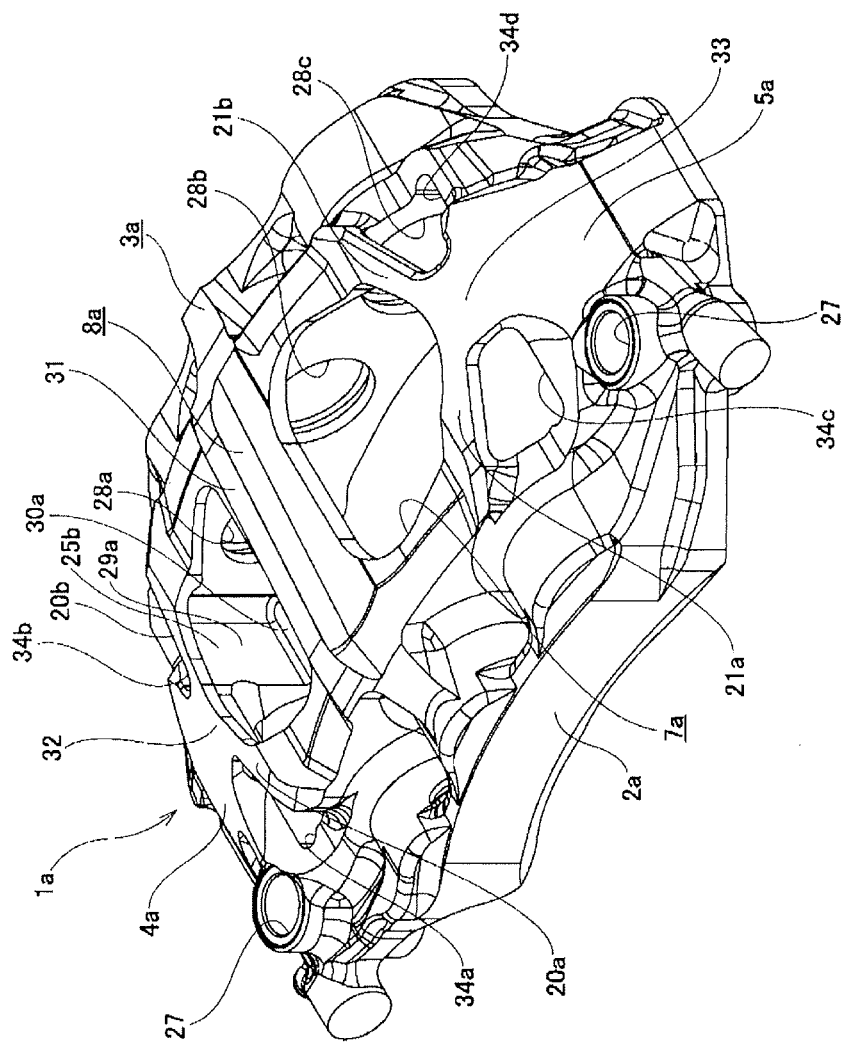
FIG. 11 is a view illustrating the caliper detached from the opposed-piston disc brake, which is equivalent to FIG. 5.
Figure 12:
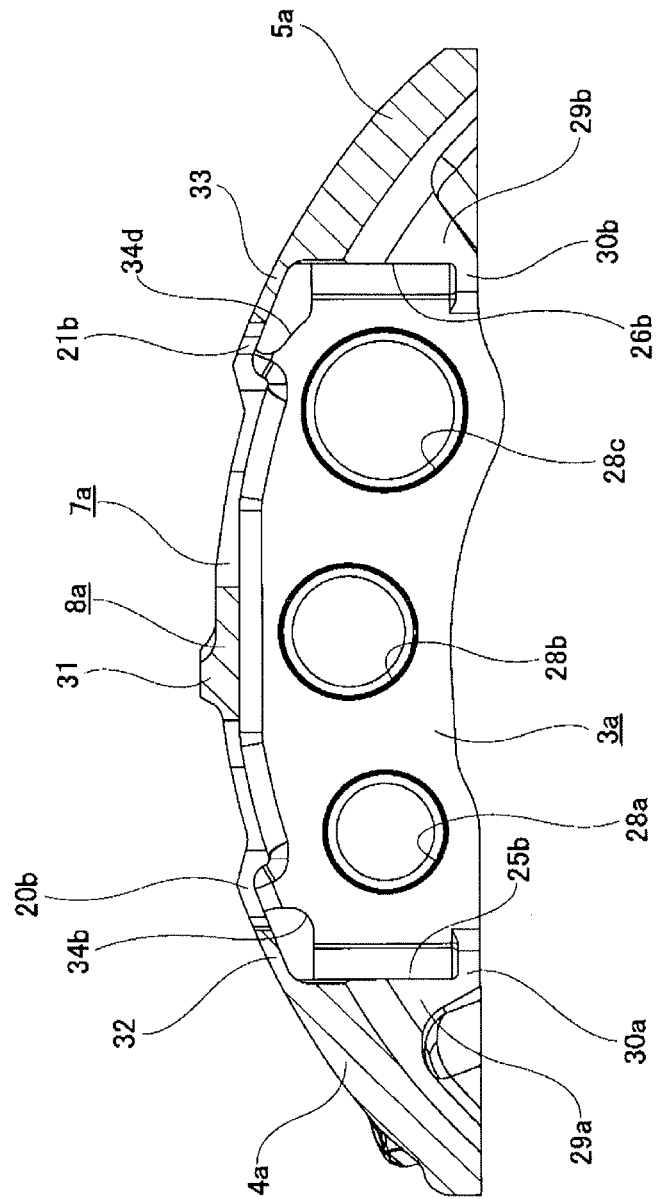
FIG. 12 is a view illustrating the caliper detached from the opposed-piston disc brake, which is equivalent to FIG. 6.
Figure 13C:
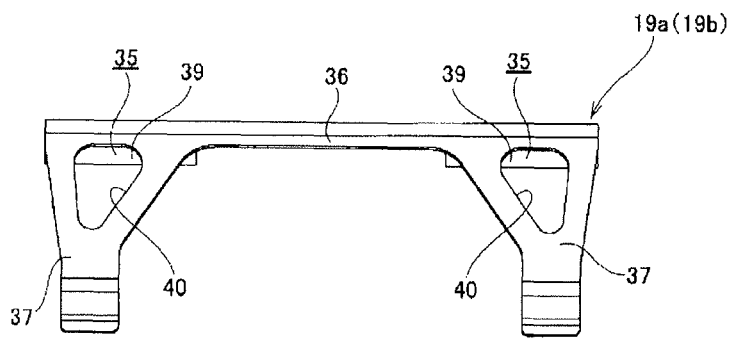
FIGS. 13A to 13C illustrate a pad clip detached from the opposed-piston disc brake.
Figure 13A:
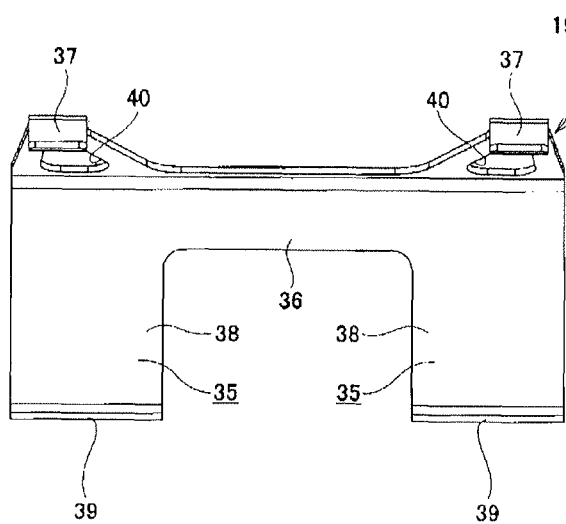
Figure 13B:
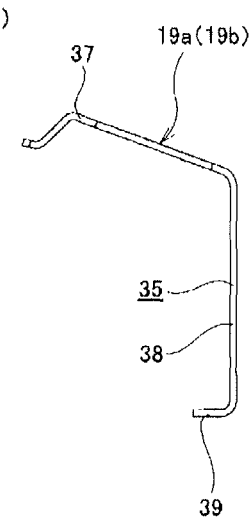

An embodiment of the present invention will be described with reference to FIGS. 1 to 14. An opposed-piston disc brake in this embodiment broadly includes a caliper 1a; a pair of pads 17 and 18 (an inner pad 17 and an outer pad 18); and a pair of pad clips 19a and 19b.

The caliper 1a is an integral cast component made of a light alloy such as an aluminum alloy or an iron alloy. The caliper 1a includes an inner body portion 2a; an outer body portion 3a; an entry-side connection portion 4a; an exit-side connection portion 5a; an opening portion 7a; a central bridge portion 8a; and four reinforcement bridge portions 20 and 21 (entry-side reinforcement bridge portions 20a and 20b, and exit-side reinforcement bridge portions 21a and 21b).

Figure 16:
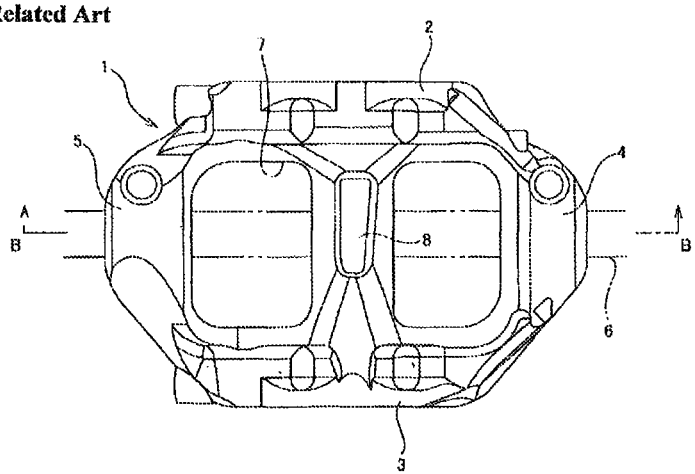
FIG. 16 is a top view of the opposed-piston disc brake caliper.
Figure 17:
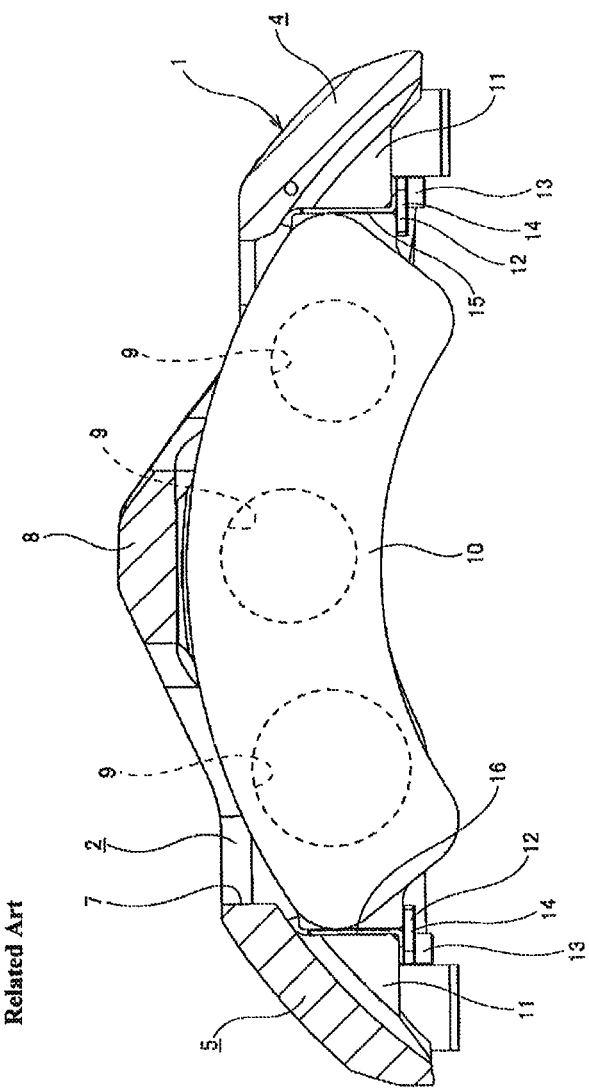
FIG. 17 is a sectional view taken along line B-B in FIG. 16 illustrating a state in which an inner pad is assembled with the opposed-piston disc brake caliper.

The inner body portion 2a among these portions is provided to face an inner-side surface of a rotor 6 (refer to FIG. 16) rotating along with a wheel. The inner body portion 2a includes multiple (three in the illustrated embodiment) inner cylinders 22a, 22b, and 22c, each of which opens toward the inner-side surface of the rotor 6. In the illustrated structure, the entry-side inner cylinder 22a has an inner diameter larger than that of the central inner cylinder 22b, and the central inner cylinder 22b has an inner diameter larger than that of the exit-side inner cylinder 22c. Inner-side projecting wall portions 23a and 23b are respectively provided in both circumferential end portions of an outer-side surface (which is a surface of the inner body portion 2a facing the outer body portion 3a) of the inner body portion 2a in such a way as to project in an axial direction. Inner-side engagement convex portions 24a and 24b are respectively provided in radial inner end portions of both the inner-side projecting wall portions 23a and 23b, and protrude in a circumferential direction so as to approach each other. The gap between circumferential inner surfaces (surfaces which exclude portions in which the inner-side engagement convex portions 24a and 24b are provided) of both the inner-side projecting wall portions 23a and 23b facing each other in the circumferential direction is set to be slightly larger than a circumferential length dimension of a pressure plate 17a of the inner pad 17. In contrast, the gap between tip end surfaces of both the inner-side engagement convex portions 24a and 24b facing each other in the circumferential direction is set to be smaller than the circumferential length dimension of the pressure plate 17a.

In an assembled state of a disc brake, the inner pad 17 is disposed between the circumferential inner surfaces of both the inner-side projecting wall portions 23a and 23b with the inner pad 17 interposed between pad clips 19a and 19b (to be described later), and both circumferential end portions of the inner pad 17 (the pressure plate 17a) are respectively engaged with both the inner-side engagement convex portions 24a and 24b in such a way that the inner pad 17 can be displaced in the axial direction. Accordingly, in this embodiment, an entry-side torque receiving portion 25a on an inner side is formed of the circumferential inner surface of the inner-side projecting wall portion 23a integrally provided on an entry side of the inner body portion 2a, and a radial outer surface of the inner-side engagement convex portion 24a. An exit-side torque receiving portion 26a on the inner side is formed of the circumferential inner surface of the inner-side projecting wall portion 23b integrally provided on an exit side of the inner body portion 2a, and a radial outer surface of the inner-side engagement convex portion 24b. Attachment holes 27, 27, an oil supply port, and the like are provided in an exterior surface of the inner body portion 2a, and bolts are respectively inserted into the attachment holes 27, 27 so as to support and fix the caliper 1a to a knuckle (not illustrated). Pressurized oil is supplied into the inner cylinders 22a, 22b, and 22c, and outer cylinders 28a, 28b, and 28c (to be described later) via the oil supply port.

The outer body portion 3a is provided to face an outer-side surface of the rotor 6, and includes multiple (three in the illustrated embodiment) outer cylinders 28a, 28b, and 28c, each of which opens toward the outer-side surface of the rotor 6. In the illustrated structure, the entry-side outer cylinder 28a has an inner diameter larger than that of the central outer cylinder 28b, and the central outer cylinder 28b has an inner diameter larger than that of the exit-side outer cylinder 28c. Outer-side projecting wall portions 29a and 29b are respectively provided in both circumferential end portions of an inner-side surface of the outer body portion 3a in such a way as to project in the axial direction. Outer-side engagement convex portions 30a and 30b are respectively provided in radial inner end portions of both the outer-side projecting wall portions 29a and 29b, and protrude in the circumferential direction so as to approach each other. The gap between circumferential inner surfaces (surfaces excluding portions in which the outer-side engagement convex portions 30a and 30b are provided) of both the outer-side projecting wall portions 29a and 29b facing each other in the circumferential direction is set to be slightly larger than a circumferential length dimension of a pressure plate 18a of the outer pad 18. In contrast, the gap between tip end surfaces of both the outer-side engagement convex portions 30a and 30b facing each other in the circumferential direction is set to be smaller than the circumferential length dimension of the pressure plate 18a.

In an assembled state of the disc brake, the outer pad 18 is disposed between the circumferential inner surfaces of both the outer-side projecting wall portions 29a and 29b with the outer pad 18 interposed between the pad clips 19a and 19b (to be described later), and both circumferential end portions of the outer pad 18 (the pressure plate 18a) are respectively engaged with both the outer-side engagement convex portions 30a and 30b in such a way that the outer pad 18 can be displaced in the axial direction. Accordingly, in this embodiment, an entry-side torque receiving portion 25b on an outer side is formed of the circumferential inner surface of the outer-side projecting wall portion 29a integrally provided on an entry side of the outer body portion 3a, and a radial outer surface of the outer-side engagement convex portion 30a. An exit-side torque receiving portion 26b on the outer side is formed of the circumferential inner surface of the outer-side projecting wall portion 29b integrally provided on an exit side of the outer body portion 3a, and a radial outer surface of the outer-side engagement convex portion 30b.

In an assembled state of the disc brake, an outer circumferential edge portion of the rotor 6 enters a region between axial side surfaces of the inner-side projecting wall portions 23a and 23b and axial side surfaces of the outer-side projecting wall portions 29a and 29b.

Both the entry-side connection portion 4a and the exit-side connection portion 5a are provided on the outside of an outer circumferential edge of the rotor 6 in the radial direction, and connect both the circumferential end portions of the inner body portion 2a to both the circumferential end portions of the outer body portion 3a. More specifically, the entry-side connection portion 4a connects the entry-side end portion of the inner body portion 2a to the entry-side end portion of the outer body portion 3a in the axial direction. The exit-side connection portion 5a connects the exit-side end portion of the inner body portion 2a to the exit-side end portion of the outer body portion 3a in the axial direction.

The opening portion 7a is provided in a substantially rectangular shape in a top view to radially pass through a region, the circumference of which is surrounded by both the inner body portion 2a and the outer body portion 3a, and both the entry-side connection portion 4a and the exit-side connection portion 5a. In particular, in this embodiment, the opening portion 7a is set to have a circumferential length dimension larger than that of the aforementioned structure in the related art. The circumferential positions of both circumferential end portions of the opening portion 7a (the positions of inner end edges of the entry-side connection portion 4a and the exit-side connection portion 5a) are set to respectively coincide with the circumferential positions of the circumferential inner surfaces of the respective inner-side projecting wall portions 23a and 23b of the entry-side torque receiving portions 25a and 25b, and the circumferential positions of the circumferential inner surfaces of the respective outer-side projecting wall portions 29a and 29b of the exit-side torque receiving portions 26a and 26b. For this reason, the circumferential positions of both the circumferential end portions of the opening portion 7a are located in the radial direction on the outside of the respective inner-side engagement convex portions 24a and 24b of the entry-side torque receiving portions 25a and 25b, and the respective outer-side engagement convex portions 30a and 30b of the exit-side torque receiving portions 26a and 26b.

A circumferential intermediate portion of the inner body portion 2a is connected to a circumferential intermediate portion of the outer body portion 3a via the central bridge portion 8a that is provided on the outside of the outer circumferential edge of the rotor in the radial direction while being axially (substantially in parallel with a center axis of the rotor) disposed in a circumferential central portion of the opening portion 7a. In this embodiment, an inner-side end portion of the central bridge portion 8a is connected to a portion of the inner body portion 2a which is positionally aligned with the inner cylinder 22b disposed at the circumferential center of the inner body portion 2a. An outer-side end portion of the central bridge portion 8a is connected to a portion of the outer body portion 3a which is positionally aligned with the outer cylinder 28b disposed at the circumferential center of the outer body portion 3a. A rib portion 31 protruding outwards in the radial direction is provided over the entire length of an entry-side half portion on a radial outer surface of the central bridge portion 8a. An entry-side portion of the central bridge portion 8a is set to have a radial thickness dimension larger than that of an exit-side portion of the central bridge portion 8a. In this embodiment, the central bridge portion 8a divides the opening portion 7a into two sections in the circumferential direction.

In particular, in the caliper 1a of this embodiment, the entry-side reinforcement bridge portions 20a and 20b inclined relative to the axial direction are provided in a substantially V shape on the outside of the outer circumferential edge of the rotor 6 in the radial direction in such a way as to respectively bridge the gaps between the inner body portion 2a and an axial central portion of the inner end edge of the entry-side connection portion 4a, with the circumferential end portion of the opening portion 7a being partitioned off by the inner end edge, and between the outer body portion 3a and the axial central portion of the inner end edge of the entry-side connection portion 4a. The exit-side reinforcement bridge portions 21a and 21b inclined relative to the axial direction are provided in a substantially V shape on the outside of the outer circumferential edge of the rotor 6 in the radial direction in such a way as to respectively bridge the gaps between the inner body portion 2a and an axial central portion of the inner end edge of the exit-side connection portion 5a, with the circumferential end portion of the opening portion 7a being partitioned off by the inner end edge, and between the outer body portion 3a and the axial central portion of the inner end edge of the exit-side connection portion 5a. In this embodiment, the entry-side reinforcement bridge portions 20a and 20b and the exit-side reinforcement bridge portions 21a and 21b are set to have rigidity (width dimension and thickness dimension) lower than the rigidity (width dimension and thickness dimension) of the central bridge portion 8a.

Between the entry-side reinforcement bridge portions 20a and 20b, a circumferential inner end portion (central end portion) of the entry-side reinforcement bridge portion 20a on the inner side is connected to a portion of the inner body portion 2a which is positionally aligned with the inner cylinder 22a disposed on the entry side. A circumferential inner end portion (central end portion) of the entry-side reinforcement bridge portion 20b on the outer side is connected to a portion of the outer body portion 3a which is positionally aligned with the outer cylinder 28a disposed on the entry side. In contrast, a circumferential outer end portion (entry-side end portion) of the entry-side reinforcement bridge portion 20a on the inner side, and a circumferential outer end portion (entry-side end portion) of the entry-side reinforcement bridge portion 20b on the outer side are connected to the entry-side connection portion 4a via an entry-side joint portion 32 extending in the circumferential direction. More specifically, the circumferential outer end portions of both the entry-side reinforcement bridge portions 20a and 20b are connected to a circumferential inner end edge of the entry-side joint portion 32 that is provided to extend inwards from the axial central portion of the inner end edge of the entry-side connection portion 4a in the circumferential direction.

In contrast, between the exit-side reinforcement bridge portions 21a and 21b, a circumferential inner end portion (central end portion) of the exit-side reinforcement bridge portion 21a on the inner side is connected to a portion of the inner body portion 2a which is positionally aligned with the inner cylinder 22c disposed on the exit side. A circumferential inner end portion (central end portion) of the exit-side reinforcement bridge portion 21b on the outer side is connected to a portion of the outer body portion 3a which is positionally aligned with the outer cylinder 28c disposed on the exit side. In contrast, a circumferential outer end portion (exit-side end portion) of the exit-side reinforcement bridge portion 21a on the inner side, and a circumferential outer end portion (exit-side end portion) of the exit-side reinforcement bridge portion 21b on the outer side are connected to the exit-side connection portion 5a via an exit-side joint portion 33 extending in the circumferential direction. More specifically, the circumferential outer end portions of both the exit-side reinforcement bridge portions 21a and 21b are connected to a circumferential inner end edge of the exit-side joint portion 33 that is provided to extend inwards from the axial central portion of the inner end edge of the exit-side connection portion 5a in the circumferential direction.

In this embodiment, each of the entry-side reinforcement bridge portions 20a and 20b, and the exit-side reinforcement bridge portions 21a and 21b is provided to have the aforementioned configuration, and thus, corner opening portions 34a, 34b, 34c, and 34d are respectively formed in a substantially trapezoidal shape at four corners of the opening portion 7a, and are divided off from other portions (inner portions) by the entry-side reinforcement bridge portions 20a and 20b and the exit-side reinforcement bridge portions 21a and 21b. The entry-side torque receiving portions 25a and 25b and the exit-side torque receiving portions 26a and 26b are exposed toward the outside in the radial direction via the corner opening portions 34a, 34b, 34c, and 34d, respectively. In this embodiment, the radial thickness dimension, the radial position of disposition, or the like of each of the entry-side reinforcement bridge portions 20a and 20b and the exit-side reinforcement bridge portions 21a and 21b is adjusted, and thus, each of the corner opening portions 34a, 34b, 34c, and 34d opens not only in the radial direction, but also in the axial and circumferential directions.

In the caliper 1a with the aforementioned configuration in this embodiment, the pad clip 19a is provided between the entry-side torque receiving portion 25a and one circumferential end portion of the pressure plate 17a of the inner pad 17, and between the entry-side torque receiving portion 25b and the pressure plate 18a of the outer pad 18, and the clip 19b is provided between the exit-side torque receiving portion 26a and the other circumferential end portion of the pressure plate 17a of the inner pad 17, and between the exit-side torque receiving portion 26b and the other circumferential end portion of the pressure plate 18a of the outer pad 18. The pad clips 19a and 19b prevent rust from occurring on slide portions between the entry-side torque receiving portion 25a and the exit-side torque receiving portion 26a and the pressure plate 17a, and between the entry-side torque receiving portion 25b and the exit-side torque receiving portion 26b and the pressure plate 18a. The pad clips 19a and 19b restrict the slide portions from being subjected to wear, and stabilize behavior of both the inner pad 17 and the outer pad 18.

Figure 14A:
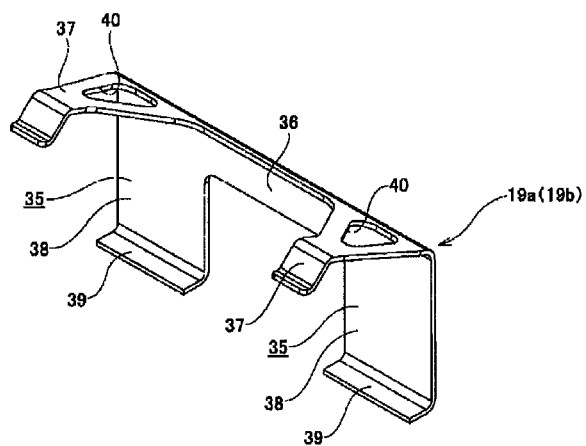
FIG. 14A is a perspective view when the pad clip detached from the opposed-piston disc brake is seen from the outside in the radial direction and the inside in a circumferential direction.
Figure 14B:
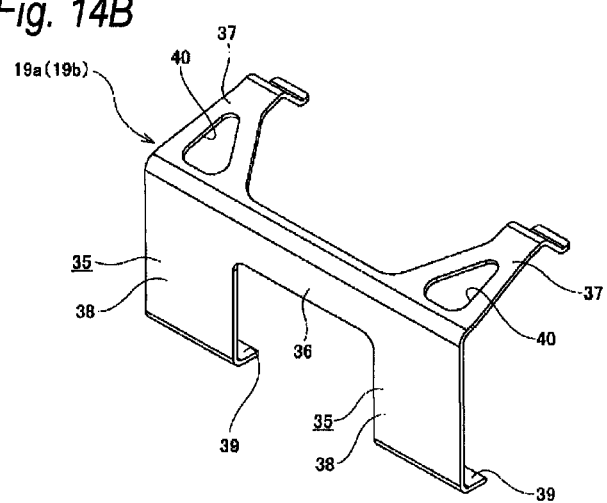
FIG. 14B is a perspective view when the pad clip detached from the opposed-piston disc brake is seen from the outside in the radial direction and the outside in a circumferential direction.
Figure 15:
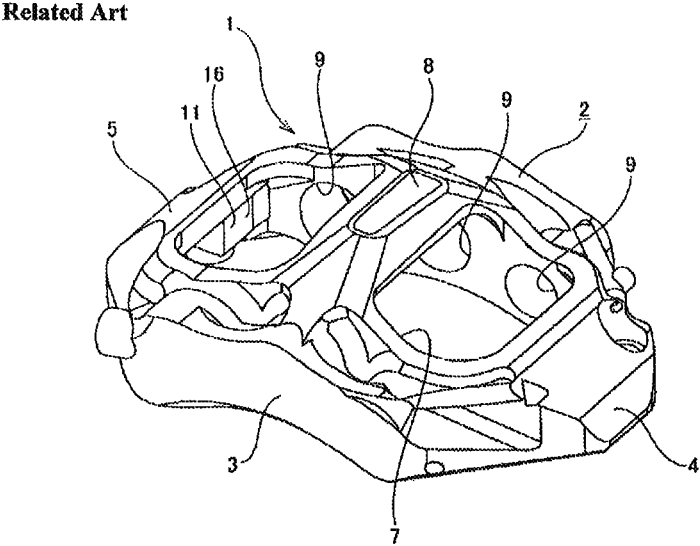
FIG. 15 is a perspective view illustrating an opposed-piston disc brake caliper having a related art structure.

Each of the pad clips 19a and 19b is made by bending a metal plate having anti-corrosion and elasticity such as a stainless spring steel plate. As illustrated in FIG. 14B, the entirety of each of the pad clips 19a and 19b is formed in a substantially H shape, and each of the pad clips 19a and 19b includes a pair of leg portions 35, 35; a connection portion 36 that connects together radial outer end portions (upper end portions) of both the leg portions 35, 35; and a pair of support arm portions 37, 37 which is further inclined inwards in the circumferential direction to the extent that the pair of support arm portions 37, 37 extends outwards from the radial outer end portions of both the leg portions 35, 35 in the radial direction. Both the leg portions 35, 35 include base plate portions 38, 38 and bent portions 39, 39, respectively. The base plate portions 38, 38 are disposed between the circumferential inner surfaces of the inner-side projecting wall portions 23a and 23b and the outer-side projecting wall portions 29a and 29b and circumferential side surfaces of the pressure plates 17a and 18a. The bent portions 39, 39 are bent at right angles inwards from inner-diameter end portions of the base plate portions 38, 38 in the circumferential direction, and are disposed between the radial outer surfaces of the inner-side engagement convex portions 24a and 24b and the outer-side engagement convex portions 30a and 30b and radial inner surfaces of circumferential end portions of the pressure plates 17a and 18a. Tip end portions of both the support arm portions 37, 37 are in elastic contact with radial inner surfaces of the entry-side reinforcement bridge portions 20a and 20b and the exit-side reinforcement bridge portions 21a and 21b, and thus, the pad clips 19a and 19b are prevented from being detached from the caliper 1a. Ventilation holes 40, 40 having a substantially triangular shape are provided in portions (base plate portions) of both the support arm portions 37, 37 which are positionally aligned with the corner opening portions 34a, 34b, 34c, and 34d.

When the opposed-piston disc brake of this embodiment is applied, inner pistons press a lining 17b of the inner pad 17, which is supported by the inner body portion 2a, against the inner-side surface of the rotor 6 using oil via the oil supply port, with the inner pistons being respectively fitted into the inner cylinders 22a, 22b, and 22c in an oil tight manner. Similarly, outer pistons press a lining 18b of the outer pad 18, which is supported by the outer body portion 3a, against the outer-side surface of the rotor 6, with the outer pistons being respectively fitted into the outer cylinders 28a, 28b, and 28c in an oil tight manner. Accordingly, the rotor 6 is durably interposed between the inner pad 17 and the outer pad 18 on both sides in the axial direction. As a result, braking is performed due to friction between the inner pad 17 and the outer pad 18 and both the axial side surfaces of the rotor 6. When the brake is applied, torque applied to both the inner pad 17 and the outer pad 18 is borne by the entry-side torque receiving portion 25a and the exit-side torque receiving portion 26a, and the entry-side torque receiving portion 25b and the exit-side torque receiving portion 26b which are respectively provided on the inner side and the outer side with the rotor 6 interposed therebetween.

In particular, in the caliper 1a of the opposed-piston disc brake of this embodiment, it is possible to improve cooling capacity, and to ensure rigidity.

That is, in this embodiment, the entry-side reinforcement bridge portions 20a and 20b, and the exit-side reinforcement bridge portions 21a and 21b are provided in such a way as to respectively bridge the gaps between the inner body portion 2a and the axial central portion of the inner end edge of the entry-side connection portion 4a, with the circumferential end portion of the opening portion 7a being partitioned off by the inner end edge, and between the outer body portion 3a and the axial central portion of the inner end edge of the exit-side connection portion 5a. For this reason, the rigidity of the caliper 1a improves compared to when the entry-side reinforcement bridge portions 20a and 20b and the exit-side reinforcement bridge portions 21a and 21b are not provided. In particular, in this embodiment, the circumferential inner end portions of the entry-side reinforcement bridge portions 20a and 20b are respectively connected to the portions of the inner body portion 2a and the outer body portion 3a which are positionally aligned with the inner cylinder 22a and the outer cylinder 28a that are present on the entry side. The circumferential inner end portions of the exit-side reinforcement bridge portions 21a and 21b are respectively connected to the portions of the inner body portion 2a and the outer body portion 3a which are positionally aligned with the inner cylinder 22c and the outer cylinder 28c that are present on the exit side. For this reason, it is possible to effectively improve rigidity against displacement of the inner body portion 2a and the outer body portion 3a in the axial direction in which the inner body portion 2a and the outer body portion 3a move away from each other. In this embodiment, the circumferential intermediate portion of the inner body portion 2a is connected to the circumferential intermediate portion of the outer body portion 3a via the central bridge portion 8a disposed in the circumferential central portion of the opening portion 7a, and thus, it is possible to effectively prevent the inner body portion 2a and the outer body portion 3a from being elastically deformed in a direction in which the inner body portion 2a and the outer body portion 3a move away from each other. Since the entry-side reinforcement bridge portions 20a and 20b and the exit-side reinforcement bridge portions 21a and 21b are inclined relative to the axial direction, it is possible to effectively improve rigidity against the elastic deformation of the outer body portion 3a relative to the inner body portion 2a in a rotational direction of the rotor 6.

In this embodiment, the circumferential width dimensions of both the entry-side connection portion 4a and the exit-side connection portion 5a are reduced (the circumferential width dimension of the opening portion 7a is increased) to the extent that the rigidity improves as described above, and thus, the entry-side torque receiving portions 25a and 25b and the exit-side torque receiving portions 26a and 26b are respectively exposed toward the outside in the radial direction via the corner opening portions 34a, 34b, 34c, and 34d of the opening portion 7a which are divided off from other portions by the entry-side reinforcement bridge portions 20a and 20b and the exit-side reinforcement bridge portions 21a and 21b. Accordingly, the entry-side torque receiving portions 25a and 25b and the exit-side torque receiving portions 26a and 26b can be directly cooled (direct introduction of cooling air) via the corner opening portions 34a, 34b, 34c, and 34d (the ventilation holes 40, 40) of the opening portion 7a, respectively, and thus, it is possible to effectively restrict an increase in the temperature of the caliper 1a and a brake fluid. As a result, in the caliper 1a of this embodiment, it is possible to improve cooling capacity and to ensure rigidity.

In this embodiment, a cutting tool such as an end mill, a grinding tool, or the like can be inserted into the caliper 1a from the outside in the radial direction via the corner opening portions 34a, 34b, 34c, and 34d, and thus, it is possible to process the entry-side torque receiving portions 25a and 25b and the exit-side torque receiving portions 26a and 26b from the outside of the caliper 1a in the radial direction. In this embodiment, the circumferential outer end portions of the entry-side reinforcement bridge portions 20a and 20b and the exit-side reinforcement bridge portions 21a and 21b are respectively connected to the entry-side connection portion 4a and the exit-side connection portion 5a via the entry-side joint portion 32 and the exit-side joint portion 33, and thus, it is possible to increase the circumferential length dimensions of portions on the rotor 6 side (adjacent to the center of the caliper 1a) of the corner opening portions 34a, 34b, 34c, and 34d in the axial direction compared to when the entry-side joint portion 32 and the exit-side joint portion 33 are not provided. For this reason, when the entry-side torque receiving portions 25a and 25b and the exit-side torque receiving portions 26a and 26b are processed via the corner opening portions 34a, 34b, 34c, and 34d, it is possible to improve processability of the portions on the rotor 6 side of the entry-side torque receiving portions 25a and 25b and the exit-side torque receiving portions 26a and 26b in the axial direction.

In this embodiment, the radial inner surfaces of the entry-side reinforcement bridge portions 20a and 20b and the exit-side reinforcement bridge portions 21a and 21b are capable of elastically supporting the pad clips 19a and 19b which are disposed between the circumferential end portions of the inner pad 17 and the outer pad 18 and the entry-side torque receiving portions 25a and 25b and the exit-side torque receiving portions 26a and 26b. For this reason, it is possible to stabilize behavior of both the inner pad 17 and the outer pad 18 due to the provision of the pad clips 19a and 19b.

The rib portion 31 is provided on the radial outer surface of the entry-side portion of the central bridge portion 8a such that the rigidity of the entry-side portion of the central bridge portion 8a is increased, and thus, without being harmfully deformed, an entry-side portion on a radial inner surface of the central bridge portion 8a is capable of bearing force that causes entry-side portions of both the inner pad 17 and the outer pad 18 to be displaced and rise upwards toward the outside in the radial direction when the brake is applied. For this reason, it is possible to stabilize behavior of both the inner pad 17 and the outer pad 18.

Each of the corner opening portions 34a, 34b, 34c, and 34d opens not only in the radial direction but also in the axial and circumferential directions, and thus, cooling air can be introduced to the rotor 6, both the inner pad 17 and the outer pad 18, the entry-side torque receiving portions 25a and 25b, and the exit-side torque receiving portions 26a and 26b not only in the radial direction but also in the axial and circumferential directions. As a result, it is possible to further improve cooling capacity.

When the present invention is realized, the opposed-piston disc brake caliper may have a monocoque structure (integral structure) in which the caliper is an integral component made of an aluminum alloy material or the like, or may have a structure in which inner-side members are connected to outer-side members using bolts.

The number of inner cylinders and the number of outer cylinders are not limited to three that is illustrated in the embodiment, and may be one, two, or four or more. In the embodiment, among the three inner cylinders and the three outer cylinders, the entry-side cylinder has an inner diameter larger than that of the central cylinder, and the central cylinder has an inner diameter larger than that of the exit-side cylinder; however, all of the cylinders may be set to have the same diameter so as to commonize components of a right wheel caliper and a left wheel caliper, or the exteriors of a right wheel cylinder portion and a left wheel cylinder portion may be processed in the same shape using casting, and the interiors of cylinders may be differently processed such that the diameters of cylinders become different according to the circumferential positions thereof. When the present invention is realized, the shapes of the entry-side torque receiving portion and the exit-side torque receiving portion are not limited to the shapes in the embodiment, and various shapes (for example, a shape in which a radial intermediate portion on the circumferential inner surface of the projecting wall portion is concave) in the related art can be adopted.

In the opposed-piston disc brake caliper of the present invention with the aforementioned configuration, it is possible to improve cooling capacity, and to ensure rigidity.

That is, in the present invention, the reinforcement bridge portions are provided in such a way as to respectively bridge the gaps between the inner body portion and the axial central portion of the inner end edge of at least the one connection portion of both the entry-side connection portion and the exit-side connection portion, with the circumferential end portion of the opening portion being partitioned off by the inner end edge, and between the outer body portion and the axial central portion of the inner end edge of the one connection portion. For this reason, the rigidity of the caliper improves compared to when the reinforcement bridge portions are not provided.

In particular, in the present invention, the circumferential inner end portions (central end portions) of the reinforcement bridge portions are respectively connected to the portions on the one connection portion side of the inner body portion and the outer body portion in the circumferential direction, with the portions being respectively positionally aligned with the inner cylinder and the outer cylinder. For this reason, it is possible to effectively improve rigidity against displacement of the inner body portion and the outer body portion in the axial direction in which the inner body and the outer body move away from each other. Since the reinforcement bridge portions are inclined relative to the axial direction, it is possible to effectively improve rigidity against the elastic deformation of the outer body portion relative to the inner body portion in a rotational direction of the rotor.

In addition, in the present invention, the circumferential width dimension of the one connection portion is reduced (the circumferential width dimension of the opening portion is increased) to the extent that the rigidity improves as described above, and thus, the torque receiving portion is exposed toward the outside in the radial direction via the corner opening portion of the opening portion which is divided off from other portions by the reinforcement bridge portion. Accordingly, in the present invention, the torque receiving portion can be directly cooled (direct introduction of cooling air) via the corner opening portion of the opening portion, and thus, it is possible to effectively restrict an increase in the temperature of the caliper and a brake fluid.

As a result, in the present invention, it is possible to improve cooling capacity and to ensure rigidity.

In the present invention, a cutting tool such as an end mill, a grinding tool, or the like can be inserted into the caliper from the outside in the radial direction via the corner opening portion, and thus, it is possible to process the torque receiving portion from the outside of the caliper in the radial direction.

According to the present invention, when the circumferential outer end portion of the reinforcement bridge portion is connected to the one connection portion via the joint portion, it is possible to increase the circumferential length dimension of a portion on the rotor side (adjacent to the center of the caliper) of the corner opening portion in the axial direction compared to when the joint portion is not provided. For this reason, when the torque receiving portion is processed via the corner opening portion, it is possible to improve processability of the portion on the rotor side of the torque receiving portion in the axial direction.

In the present invention, a radial inner surface of the reinforcement bridge portion is capable of elastically supporting the pad clips which are disposed between the circumferential end portions of both inner pad and outer pad and the torque receiving portions. For this reason, it is possible to stabilize behavior of both the inner pad and the outer pad due to the provision of the pad clips.

According to the present invention, particularly in the structure in which three or more inner cylinders and three or more outer cylinders are provided, it is possible to effectively prevent the inner body portion and the outer body portion from being elastically deformed in a direction in which the inner body portion and the outer body portion move away from each other.

According to the present invention, it is possible to increase the rigidity of the entry-side portion of the central bridge portion. For this reason, without being harmfully deformed, an entry-side portion on a radial inner surface of the central bridge portion is capable of bearing force that causes entry-side portions of both the inner pad and the outer pad to be displaced and rise upwards toward the outside in the radial direction when the brake is applied. For this reason, it is possible to stabilize behavior of both the inner pad and the outer pad.

According to the present invention, cooling air can be introduced to the rotor, both the inner pad and the outer pad, and the torque receiving portions not only in the radial direction but also in the axial direction. As a result, it is possible to further improve cooling capacity.

In contrast, also according to the present invention, cooling air can be introduced to the rotor, both the inner pad and the outer pad, and the torque receiving portions not only in the radial direction but also in the circumferential direction. As a result, it is possible to further improve cooling capacity.

What is claimed is:

1. An opposed-piston disc brake caliper comprising:
an inner body portion, provided so as to face an inner-side surface of a rotor that rotates along with a wheel, and including an inner cylinder which opens toward the inner-side surface of the rotor;
an outer body portion, provided so as to face an outer-side surface of the rotor, and including an outer cylinder which opens toward the outer-side surface of the rotor;
an entry-side connection portion and an exit-side connection portion, provided on outside of the rotor in a radial direction of the rotor, and connecting both end portions of the inner body portion to both end portions of the outer body portion in a circumferential direction of the rotor;

an entry-side torque receiving portion and an exit-side torque receiving portion, configured to bear torque which is applied to a pair of pads when a brake is applied, while the pair of pads is supported so as to be displaced in an axial direction of the rotor with the rotor being interposed therebetween; and an opening portion, passing in the radial direction through a region surrounded by both the inner body portion and the outer body portion and both the entry-side connection portion and the exit-side connection portion, wherein a pair of reinforcement bridge portions, which are inclined relative to the axial direction, are provided on the outside of the rotor in the radial direction so as to define corner opening portions in the opening portion, wherein the corner opening portions are divided off from other portions of the opening portion, and are displaced outside of the reinforcement bridge portions in the circumferential direction, one of the reinforcement bridge portions bridges a gap from an axial intermediate portion of an inner end edge of at least one of the entry-side connection portion and the exit-side connection portion, the inner end edge defining a circumferential end portion of the opening portion, to a portion on the one connection portion side of the inner body portion in the circumferential direction where the inner body portion is positionally aligned with the inner cylinder, the other of the reinforcement bridge portions bridges a gap from the axial intermediate portion of the inner end edge of the one connection portion to a portion on the one connection portion side of the outer body portion in the circumferential direction where the outer body portion is positionally aligned with the outer cylinder, and wherein at least one of the entry-side torque receiving portion and the exit-side torque receiving portion is exposed toward the outside in the radial direction via the corner opening portions.

2. The opposed-piston disc brake caliper according to claim 1,
wherein a circumferential outer end portion of the one reinforcement bridge portion is connected to the axial intermediate portion of the inner end edge of the one connection portion via a joint portion extending in the circumferential direction.

3. The opposed-piston disc brake caliper according to claim 1,
wherein the reinforcement bridge portions are respectively provided in both the entry-side connection portion and the exit-side connection portion in a bridging manner.

4. The opposed-piston disc brake caliper according to claim 1,
wherein a circumferential intermediate portion of the inner body portion is connected to a circumferential intermediate portion of the outer body portion via a central bridge portion that is provided on the outside of the rotor in the radial direction.

5. The opposed-piston disc brake caliper according to claim 4,
wherein an entry-side portion of the central bridge portion is set to have a radial thickness dimension larger than that of an exit-side portion of the central bridge portion.

6. The opposed-piston disc brake caliper according to claim 1,
wherein both the entry-side torque receiving portion and the exit-side torque receiving portion are integrally provided in each of the inner body portion and the outer body portion.

7. The opposed-piston disc brake caliper according to claim 1,
wherein the corner opening portion opens both in the radial direction and in the axial direction.

8. The opposed-piston disc brake caliper according to claim 1,
wherein the corner opening portion opens both in the radial direction and in the circumferential direction.

* * * * *